United States Patent [19]

Young

[11] 4,326,875

[45] * Apr. 27, 1982

[54] SULFUR PRODUCT AND METHOD

[75] Inventor: Donald C. Young, Fullerton, Calif.

[73] Assignee: Union Oil Company of California, Los Angeles, Calif.

[*] Notice: The portion of the term of this patent subsequent to Nov. 24, 1998, has been disclaimed.

[21] Appl. No.: 106,390

[22] Filed: Dec. 26, 1979

Related U.S. Application Data

[60] Division of Ser. No. 972,729, Dec. 26, 1978, which is a continuation-in-part of Ser. No. 803,585, Jun. 6, 1977, abandoned.

[51] Int. Cl.³ .............................................. C05G 3/06
[52] U.S. Cl. ........................................ 71/11; 71/64.4; 71/64.6; 71/64.12; 71/904; 264/11; 252/189; 252/309; 424/164
[58] Field of Search ................... 71/11, 15, 23, 27, 28, 71/31, 64 DC, 64 DB, 64 F, 64 G, 64 SC, 64.4, 64.6, 64.12; 264/7, 11, 12, 13, 14; 252/189, 309; 424/162, 164; 106/274, 285, 287.32, 288 Q

[56] References Cited

U.S. PATENT DOCUMENTS

| | | | |
|---|---|---|---|
| 2,774,660 | 12/1956 | Cook et al. | 264/14 |
| 2,844,541 | 7/1958 | Work | 252/314 |
| 3,100,698 | 8/1963 | Horsley et al. | 71/28 |
| 3,186,826 | 6/1965 | Rendon | 71/23 X |
| 3,295,950 | 1/1967 | Blouin et al. | 71/64 F |
| 3,342,577 | 9/1967 | Blouin et al. | 71/64 F X |
| 3,567,419 | 3/1971 | Dean et al. | 71/64 F |
| 3,637,351 | 1/1972 | Young et al. | 264/13 X |
| 3,661,530 | 5/1972 | Block | 424/162 X |
| 3,663,478 | 5/1972 | Kuhre et al. | 252/309 X |
| 3,769,378 | 10/1973 | Young et al. | 264/13 |
| 3,830,631 | 8/1974 | Young et al. | 264/12 X |
| 3,982,920 | 9/1976 | Cross et al. | 71/27 X |
| 4,024,210 | 5/1977 | Chalmers | 264/11 |
| 4,026,694 | 5/1977 | Cross et al. | 71/11 |
| 4,133,668 | 1/1979 | Young | 71/11 |

FOREIGN PATENT DOCUMENTS 2340638 2/1975 Fed. Rep. of Germany ...... 71/64 F

OTHER PUBLICATIONS

Kittams; Use of Sulfur for Increasing the Availability of Phosphorous in Rock Phosphate, 1968; Doctoral Thesis for U. of Wisconsin, pp. 4-12, 88-93.

Primary Examiner—S. Leon Bashore
Assistant Examiner—F. H. Lander
Attorney, Agent, or Firm—Michael H. Laird; Dean Sandford

[57] ABSTRACT

Homogeneous sulfur-hydrocarbon blends comprising a continuous sulfur matrix containing hydrocarbon, and methods of manufacture and use are described. These materials are particularly suitable as soil supplements, for comminution, or for compounding with hydrophobic materials such as elastomers and oil-based paints. Several advantages are apparent in essentially any application involving storage or transport.

6 Claims, 2 Drawing Figures

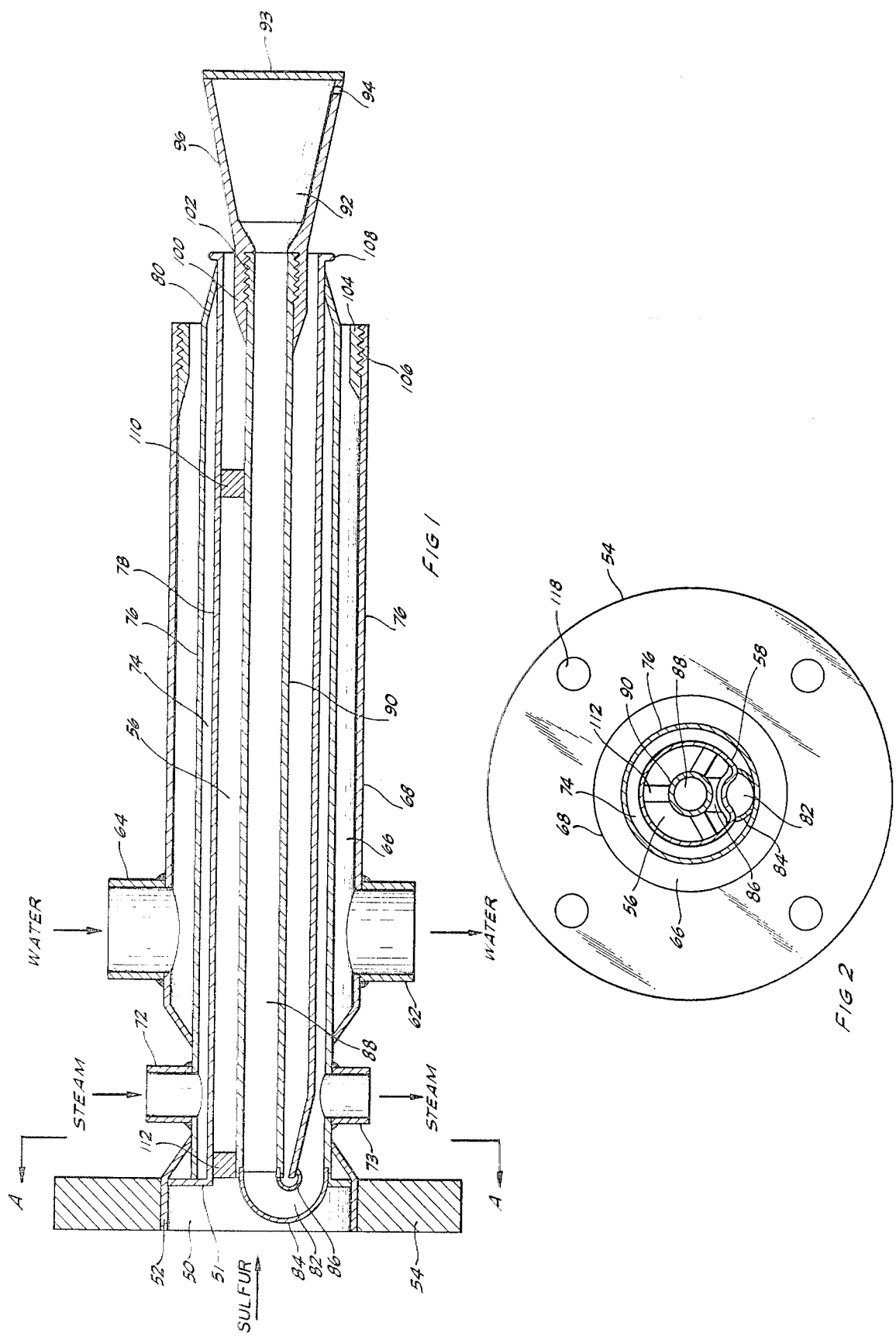

SULFUR PRODUCT AND METHOD

This application is a division of my copending application Ser. No. 972,729 filed Dec. 26, 1978, which was a continuation-in-part of my application Ser. No. 803,585, filed June 6, 1977 and now abandoned.

BACKGROUND OF THE INVENTION

Elemental sulfur is widely used in the agricultural and chemical industries as a soil amendment, with or without other components, as a chemical precursor (sulfuric acid) and as a compound in elastomeric, paint, road surface and structural material formulations.

The present invention involves the improvement of several sulfur properties, particularly those properties that influence agronomic use, compounding or formulation with hydrophobic materials, and general ease and safety of transport and handling. Relevant properties include grindability, particle fluidity, bridging in process or transport equipment, water retention, and resistance to oxidation and corrosion.

These compositions comprise homogeneous distributions of certain hydrocarbons in an elemental sulfur matrix. They may or may not contain other components as desired. The oil is distributed evenly throughout a continuous sulfur matrix. This property provides a predetermined hydrocarbon-sulfur ratio regardless of grinding, or particle consumption in use. It allows for higher hydrocarbon loadings and reduced surface cohesiveness at high loading and reduces agglomeration and bridging.

In these and other respects these compositions are superior to other hydrocarbon-sulfur combinations suggested in the prior art. For instance, Block U.S. Pat. No. 3,661,530 suggests that several deficiencies of dusting sulfur can be minimized by post manufacture sulfur application of a variety of hydrocarbon compounds. Block was concerned primarily with fluidity (sulfurs that remain free-flowing) and agglomeration or anti-caking qualities which are known problems with finely divided sulfurs.

Undoubtedly Block's procedures reduce the magnitude of these problems. However, I have found that surface application has several disadvantages. Only a limited amount of hydrocarbon can be retained on the particle surface, and even less than this limit should be added to avoid agglomeration (depending on hydrocarbon properties and conditions of use). Excess hydrocarbon which is tacky during use will itself cause agglomeration and the problems which Block seeks to avoid. More importantly, the continuous sulfur-hydrocarbon interface will persist only so long as the particles are not further comminuted, degraded or consumed during use by bacterial action, grinding, or high shear blending. Any of these common occurrences will expose uncoated surfaces.

In contrast, the compositions of this invention do not suffer the same deficiencies. Particles obtained by fracturing larger particles or blocks still contain hydrocarbon disposed throughout the sulfur matrix since, in the first instance, the hydrocarbon is not simply coated on the exterior surface of the block, particle, etc., or contained in some coating that covers only the particle or block surface. Thus, no matter how small the blocks or particles are ground by any procedure, the resulting particles and dust contain the amount of hydrocarbon desired.

It is therefore one object of this invention to provide improved hydrocarbon-sulfur combinations. Another object is the provision of a homogeneous sulfur-hydrogen blend in which the hydrocarbon is evenly distributed throughout a continuous sulfur matrix. Another object is the provision of sulfur particles which are less hygroscopic, are more fluid, and therefore have less tendency to bridge or plug equipment, are less corrosive, and have less tendency to dust. Another object is the provision of hydrocarbon-containing sulfur particles of hydrocarbon loading and acceptably low surface tack.

Yet another object is the provision of hydrocarbon-containing sulfurs which are particularly suitable soil amendments due to the relatively constant ratio of hydrocarbon and sulfur throughout the particle matrix. Soil sulfurs are gradually converted to sulfates by sulfur-active bacteria (thiobacilli). Some of these bacteria are homotropic (autotropic) in that they require sulfur as their only solid nutrient. However, many more species are heterotropic, and they also require a non-toxic carbon source.

Obviously heterotropic thiobacilli can initially obtain both sulfur and hydrocarbon from hydrocarbon-coated sulfurs such as those described in U.S. Pat. No. 3,661,530. However, the oil coating gradually dissipates due to bacterial action and/or ground water leaching. The partially consumed or leached particles then present an environment—carbon-free, pure sulfur—that will not support heterotropic species.

That is not the case with the compositions of this invention. They are homogeneous; the hydrocarbon is evenly distributed throughout the sulfur matrix.

Similar problems would arise with sulfurs originally provided in blocks or large particles and later ground into smaller sizes. The major surface of the fractured particles contains no hydrocarbon. These surfaces would not present the best environment for bacterial activity—sulfur conversion to sulfate.

I have found that fracturing hydrocarbon-coated sulfurs also reduces product quality in other respects. The uncoated surfaces become hygroscopic (once oxidized) which detracts from overall water repellancy. Such products are more corrosive, less fluid, and have more tendency to dust.

I have also found that the presence of hydrocarbon at the particle surface significantly reduces bridging and plugging during transport and use. However, this property is lost, at least in degree, in heterogeneous particles which are fractured after coating.

The inadequacies of prior art compositions can be overcome, at least in degree, by producing particles which comprise the homogeneous combination of a continuous sulfur matrix and certain hydrocarbons evenly distributed throughout that matrix. I have discovered that these hydrocarbons can be compounded into homogeneous molten sulfur blends, and that they remain evenly dispersed in both the melt and solid phases during quenching, particle formation, storage and use.

My procedure also avoids the need for surfactants which, as suggested by Block, supra, are required to obtain adequate hydrocarbon coverage of hydrophilic (oxidized) sulfur surfaces. In fact, I have found that it is often preferable to exclude surfactants due to their reactivity with the sulfur melt and potential toxicity in agronomic use.

While the hydrocarbon does not intolerably weaken the particle product, even at relatively high hydrocarbon loadings, the products are somewhat more friable than are hydrocarbon-free materials. Thus, they are sufficiently hard to retain their size and shape during conventional handling yet require less energy for grinding, if desired.

These methods and compositions also allow higher hydrocarbon loadings than does surface application. They assume a constant oil-to-sulfur ratio throughout each particle. Thus a predetermined ratio can be maintained even after grinding or during use. This homogeneity also assures the continuity of certain physical properties even in ground or partially consumed products. Thus at all stages the particles are free-flowing, hydrophobic, and non-corrosive.

Regardless of fracturing or crushing after manufacture, these products have less tendency to dust and maintain their improved affinity for non-polar, hydrophobic substances. This property is desirable for compounding with non-polar materials such as rubber, oil-based paints and similar compositions. Such compositions are more stable and are easier to produce in the first instance.

In accordance with one embodiment, these methods involve forming a melt containing at least 60 weight percent elemental sulfur at a melt temperature of about 120° to about 400° C. and homogeneously dispersing throughout the melt at least about 0.2 weight percent of the hydrocarbon and solidifying the resulting blend. The combinations can be subdivided during or after quenching it desired. They are homogeneous and comprise a continuous rhombic sulfur matrix with the hydrocarbon evenly distributed throughout.

The compositions of this invention can contain essentially any type of hydrocarbon including hydrocarbons that may react to a slight extent with sulfur at the melt temperature or otherwise. For obvious reasons, however, I generally prefer to minimize the amount of reactive hydrocarbons in the mixture to avoid unnecessary process complications and the introduction of possibly unnecessary toxic materials. Thus reactive hydrocarbons such as olefins, alkynes, etc., should be kept to a minimum in most circumstances, e.g., at a level of less than about 15 percent, preferably less than 1 percent of total hydrocarbon.

In the case of formulations intended for agricultural use, the hydrocarbon is preferably selected from non-toxic materials that are not reactive with sulfur under reaction conditions. These include principally the paraffinic and alkyl substituted and unsubstituted aromatic hydrocarbons and combinations of these. The hydrocarbon boiling and melting points are determined primarily in view of the conditions required to obtain the compositions of this invention. Since the presently preferred method involves addition of the hydrocarbon to the sulfur melt, distribution of the hydrocarbon throughout the melt, and cooling to form the homogeneous fusions, the hydrocarbon should have a boiling point above the selected melt temperature and a melting point below the selected temperature. This criteria allows for considerable variation as will be understood by practitioners skilled in this art. The preferred manufacturing methods contemplate melt temperatures of about 120° to about 400° C. Thus, as a general rule, the hydrocarbon will have melting points below 400° C. and boiling points above 120° C. Obviously, higher boiling hydrocarbons should be used at higher melt temperatures. Similarly, higher melt temperatures should be used with higher melting point hydrocarbons that might not melt and/or distribute adequately at lower melt temperatures. Thus the practitioner can easily select the melt temperature and hydrocarbon melting and boiling points that best accommodate his situation.

Suitable hydrocarbons include virgin or partially refined crudes or synthetic crudes derived from coal, oil shale or other origins of natural or synthetic paraffins, aromatics and/or alkyl aromatics and combinations thereof. Illustrative are paraffin waxes, gas oils, crude oil, reduced crude oil residuum, naphtha, diesel oil, fuel oil, light and heavy gas oils, kerosene, jet fuel, 80 to 300 neutral oils, paraffin waxes, hydrocarbon homo- or heteropolymer oils, waxes or thermoplastics such as polyolefins, polystyrene, and the like.

The hydrocarbons preferred for agricultural use should be non-polar and non-reactive with sulfur or other components of the composition at melt temperature. They are preferably paraffinic, aromatic, or alkyl aromatic or combinations of these. They should be liquid at the melt temperature and thus should have a melting point below and a boiling point above melt temperature. Usually the hydrocarbon will melt at least about 10° C. and preferably about 20° C. below melt temperature and will have a boiling point of at least 10° C., preferably at least about 20° C. above melt temperature. However, I have found they need not be solid at ambient conditions since the great majority of the hydrocarbon is confined in the sulfur matrix. In some applications, higher melting hydrocarbons, e.g., those having melting points above ambient, may be preferred at the higher loadings, e.g., above 15 weight percent, to reduce surface tack.

Due to the preference for non-reactive, non-toxic hydrocarbons in compositions intended for agricultural use, the hydrocarbon should be substantially free of olefins, alkynes, alkenyl aromatics and, in those products, should not contain reactive functional groups such as hydroxyl, amino, ether, aldo, keto, or carboxyl groups, or the like. This exclusion does not include most halogenated hydrocarbons which are generally unreactive, at least at the lower temperature. Aromatics are somewhat refractive to bacteria. Accordingly, paraffins are particularly preferred for agronomic use.

Hydrocarbon loadings are usually at least 0.2 weight percent up to about 40 weight percent, normally 0.2 to about 20, and preferably 0.2 to about 10 weight percent based on total weight. Most uses involve loadings of 0.2 to about 5 percent.

While the desirable properties are generally reflected in particles of any size, most applications will require, or are at least better served by particles having average diameters of less than about 1 inch, usually less than about ¾ inch. Numerous methods of obtaining such particles are well known in the art. Surprisingly, such particles can be obtained without excessive hydrocarbon loss even in high shear contacting with aqueous quench media.

These compositions can contain other components which are thermally stable and non-reactive with the hydrocarbon or sulfur melt. Illustrative are fertilizers including major and micronutrients, fillers such as clays, pigments, and essentially any solid or molten, thermally stable, unreactive substance.

Melt temperatures range from about 120° to about 400° C. Problems of reactivity and thermal stability are less severe at the lower temperatures. The hydrocarbon is blended with the sulfur melt with sufficient agitation to assure homogeneity. The blend is then quenched into blocks or particles as desired.

These methods do not require surfactants for adequate hydrocarbon distribution. In fact, such materials are preferably avoided, at least in most applications, due to their reactivity at melt temperatures or their toxicity or relative refractiveness toward heterotropic sulfur-active bacteria. Moreover, surfactants would be largely wasted in the preferred particle forming techniques which involve quenching and subdividing the melt in an aqueous phase. At least some of the surfactant would be abstracted from the sulfur particles, at least from the surface. Surfactant removal results in hydrocarbon leaching from the sulfur matrix.

The melt can be quenched and, if desired, can be comminuted by essentially any known procedure. Such methods do not constitute an essential aspect of this invention. However, I have found that the blends are suitable for water quenching since very little hydrocarbon is lost, at least in the absence of surfactants. Thus the melt can be cooled into blocks and crushed to the desired particle size or it can be air cooled by conventional methods such as prilling towers.

Particularly preferred methods involve water quenching by any one of several techniques. The melt can be sprayed into a standing or agitated aqueous quench in which case particle size can be regulated by spray size and, to some extend, by agitation. Other methods involve pouring a melt into an agitated aqueous quench, in which case particle size is determined primarily by agitation severity.

A particularly preferred method is disclosed in my U.S. Pat. Nos. 3,637,351, 3,769,378 and 3,830,361, which are incorporated herein by reference. Briefly, these methods involve contacting a high velocity water spray with a high velocity spray of the homogeneous sulfur-hydrocarbon melt to form a highly turbulent zone of intersection of the two sprays in which the homogeneous composition is simultaneously subdivided and quenched into the porous particles similar to those described in the noted patents.

For purposes of illustration, these methods are described with reference to the apparatus illustrated in the accompanying drawings of which FIG. 1 is a side sectional view of a suitable melt-water mixing apparatus, and FIG. 2 is a sectional view taken along the axis of the gun at section A—A.

This apparatus creates high velocity water and melt streams and aligns these streams to intersect and produce a turbulent zone within which the melt is "captivated" and surrounded by water. The resulting turbulence breaks the melt into small particles. The sulfur and water streams can be sprayed either into the open atmosphere or into a closed container with the spray being directed to place the particles in the desired location. As a practical matter a longitudinal distance of at least about 20 feet should be provided between the end of the melt and water guns and the storage area to assure solidification before surface contact.

The water gun preferably has a constriction nozzle capable of producing a water stream having a velocity on the order of about 3 to about 90 feet per second and a vena contracta about 0.2 to about 15 pipe diameters downstream of the nozzle. The melt gun also preferably has a nozzle sufficient to produce a velocity of about 3 to about 90 linear feet per second, and should be aligned substantially parallel (0 to 20 degrees) to the water stream to intersect the water stream within the area of the vena contracta at an angle of about 0 to about 20 degrees to the longitudinal axis of the water stream. These conditions are generally sufficient to captivate and disperse the melt within the water stream without allowing melt penetration of the water phase.

The relative sulfur and water flow rates must be controlled at a level sufficient to provide adequate cooling and melt dispersion. Accordingly, this system should be operated at a water flow rate of at least about 0.6 weight part water per weight part melt, sufficient to disperse the melt into fine droplets and to cool and solidify the droplets into porous particles. Preferred water rates are about 0.6 to about 10 weight parts water per weight part melt. Water rates substantially above the upper limit generally serve no advantage and increase operating costs.

When the longitudinal axes of the sulfur and water guns are aligned at the same angle, i.e., an intersection angle of zero degrees corresponding to the lower limit of the preferred range, the constriction discharge nozzles of the water and melt guns should be coaxial as illustrated in FIG. 1. Other intersect angles can be obtained with separate guns, each of which can be aligned at an angle that will produce stream intersection in an area sufficient to captivate and disperse the melt as required.

Operating conditions are correlated to prevent substantial steam generation, thus, the lower water and melt temperatures are preferred. Ambient temperatures are suitable for the water stream although any temperature below the boiling point is adequate. Melt temperatures above about 340° F. should be avoided due to the dramatic sulfur viscosity increase above this level. Preferred melt temperatures are only slightly above the melting point.

Referring now to FIGS. 1 and 2, the prilling device comprises concentric conduits 68, 76, 78 and 90 secured to flange 54 having radially spaced bolt holes 118. Secured in the base of flange 54 is a sleeve 52 which has one end rolled into a frusto-conical shape and is welded to the outersurface of conduit 76. Ring 51 is mounted within sleeve 52, and the ends of conduits 76 and 78 are butt welded to the ring. Inner conduit 90 is supported by conduit 78 with spacers or lugs 110.

Annular passageway 74 between conduits 76 and 78 communicates with inner conduit 90 by the U-shaped conduit 84 which fits into an annular seat about the inner periphery of conduit 90. The under surface of conduit 78 is crimped slightly and a semi-circular cut in ring 51 defines opening 82 (see FIG. 2) into which is fitted the remaining end of U-shaped conduit 84 which thereby provides communication between annular passageway 74 and conduit 90.

The frusto-conical end of conduit 68 mates with and is welded to the outer periphery of conduit 76 at a point downstream of sleeve 52 to provide an assembly having a neck or reduced diameter. Nozzles 72 and 73 are carried by conduit 76 at this neck portion to provide communication with annular passageway 74. Nozzles 62 and 64 are carried by conduit 68 to provide communication with annular passageway 66 defined by conduits 68 and 76.

Conduit 68 is open at its opposite end. Preferably, a nozzle 104 is formed by a sleeve secured to the inner periphery of conduit 68 to reduce its diameter and provide an annular orifice serving as a discharge nozzle.

Nozzle 104 can be permanently attached to conduit 68 or can be removably attached by threaded joint 106. If desired, nozzle 104 can have an arcuate inner surface to define a smoothly converging entrance to the annular orifice or can have a simple conically tapered entrance.

The end of conduit 76 is rolled into a frusto-conical shape and is welded to conduit 78 to close annular passageway 74. Conduit 78 is open-ended and bears an annular lip 108. Conduit 90 supports a conical member 96 having a hollow neck 100 that fits over conduit 90 and is removably secured thereto by threads 102. Alternatively, neck 100 could be permanently welded to conduit 90. Neck 100 parts obstructs the open end of annular passageway 56 and thereby serves as a discharge nozzle. As with nozzle 104, the nozzle which is thus formed by neck 100 can have a smoothly converging throat by shaping the outer surface of neck 100 into an arcuate path along the longitudinal axis or, as shown, the inner end of neck 100 can simply be tapered. Conical member 96 is preferably hollow and closed with end cap 93 to define a chamber 92 that is in communication with conduit 90. One or more holes 94 are bored through the underside of conical member 95.

In operation, the sulfur-hydrocarbon melt flows into annular passageway 56 as shown in FIG. 1. The melt is maintained in a molten condition by indirect heat exchangers—conduits 76 and 90 which define annular passageway 74 and central passageway 88 for a heating fluid, preferably steam. Steam flows into nozzle 72 through annular passage 74 and out passage 73.

Process water is forced into nozzles 62 and 64 and through annulus 66. Nozzle 104 constricts the water discharge from passageway 66 to produce a high exit velocity. The molten sulfur flows through the passageway 56, the discharge of which is partly restricted by the nozzle formed by neck 100 to deflect the melt stream towards the outer water stream. The exit melt velocity increases as it is discharged through the nozzle throat formed by neck 100. The melt is thus discharged at a high velocity into contact with conical baffle 96 which deflects the sulfur into contact with the water stream.

Thus the melt and water are contacted in the highly turbulent region at the discharge end. The melt is dispersed into discrete droplets, presumably containing some water, solidified by the joint action of water and air, and is carried as a combined stream into a storage area. The water drains from the particles much more rapidly and completely than is the case with pure sulfur prills. Adequate blending can be obtained even if conduit 76 and deflector 96 are eliminated.

FIG. 1 shows the water conduit terminating a minor distance, e.g., 1–10% of its length, prior to termination of the sulfur conduit. This aspect and lip 108 prevent sulfur from flowing into the water conduit and plugging any portion of the water discharge during shutdown. Alternatively, conduit 68 can be extended to terminate substantially at the same point as conduit 78 to improve mixing. While conical member 96 deflects the sulfur stream into contact with the water stream, some of the water also impinges on deflector 96 and assures good mixing.

The side walls of member 96 can be inclined from the longitudinal axis of the device from 3° to about 35°, preferably from 5° to about 25°, with the length of the conical member 96 correlated with its sidewall angle to achieve the above objectives. This angle should not be great enough to impart a radial velocity vector to the sulfur sufficient to penetrate through and escape from the water stream. It is also preferred that the sidewall angle and/or length of the conical member be such that at least a substantial amount, e.g., 40–100 percent, preferably 70–100 percent, of the water stream is not deflected. This retains a substantial velocity of the combined streams useful in conveying and distributing sulfur to the storage location. To achieve this objective, the diameter of the base of conical member 96 and the position of member 96 are selected so that the base does not extend into the longitudinal extension of annular passageway 66. The angle and length of member 96, as well as the sulfur and water-exit velocities, affect the mixing of water and sulfur and the properties of the sulfur prills. The properties of the sulfur particles can be varied by using conical members of varied length and inclination angles.

Steam flows into passageway 74 defined by pipes 76 and 78 and through space 82 defined by U tube 84 into passageway 88 defined by conduit 90. The steam also flows through conduit 90 and into conical member 96 to prevent melt solidification on the exterior of cone 96. Condensate is removed through nozzle 73 and bore 94 in conical member 96.

Alternatively, steam may be introduced directly into passageway 88 by a nozzle communicating with conduit 90. In this manner the melt is heated only from the interior of the device and the water conduit is in direct communication with the sulfur conduit with no intervening steam jacket. This embodiment has the advantage that better mixing can be achieved at the exit since there is a minimum of area separating the respective streams.

The principal variables in this device are absolute and relative stream velocities and mass rates. Water and melt velocities and determined by mass flow rate and nozzle cross-section. The following table summarizes the ranges of variables:

TABLE

|  | Broad | Intermediate | Narrow |
|---|---|---|---|
| Exit water velocity, feet/sec | 3–90 | 10–60 | 24–45 |
| Exit sulfur velocity, feet/sec | 3–90 | 10–60 | 25–45 |
| Ratio, water velocity/sulfur velocity | 0.4:1–20 | 0.5:1–5:1 | 0.7:1–2:1 |
| Ratio, water mass flow rate/ sulfur mass flow rate | 0.2:1–20:1 | 0.6:1–10:1 | 0.7:1–2:1 |

The preferred products obtained from this device have diameters of about 0.02 to about 0.11 inch, bulk densities below about 1.9, generally below about 1.3, and preferably about 0.9 to about 1.3 grams per cc, porosities of at least about 0.04, generally about 0.04 to about 0.15 cc per gram, and internal surface areas of at least about 20, preferably about 30 to 100 square centimeters per gram.

These compositions have numerous utilities, several of which are discussed above. They are suitable for any known use of elemental sulfur in which the hydrocarbon does not interfere. They are particularly useful as soil sulfurs. Non-toxic hydrocarbons significantly increase bacterial growth and activity which is advantageous when higher sulfuate availability rates are desired. Application rates as soil sulfurs are ordinarily at least about 20, usually from 20 to about 800 pounds per acre.

EXAMPLE 1

A homogeneous sulfur-hydrocarbon fusion containing micronutrient zinc was prepared using the apparatus illustrated in the drawings. The hydrocarbon was a surfactant-free, nonphytotoxic, 90 N paraffinic spray oil containing less than 15 weight percent aromatics and having a melting point of −15° C. and an initial boiling point of 315° C. The product contained 4 weight percent hydrocarbon and 4 weight percent zinc oxide based on total weight.

A semi-stable, anhydrous (less than 0.5 weight percent water) suspension of powdered zinc oxide in the hydrocarbon was first prepared and this combination was metered into the sulfur melt reservoir feeding the sulfur gun. Operating conditions included a melt temperature of 130° C., water rate and velocity of 1000 pounds per minute and 30 feet per second, respectively, and a sulfur mass rate and velocity of 1000 pounds per minute and 25 feet per second, respectively.

The product comprised porous sulfur particles having an average particle size of about 0.1 inch. Carbon analysis established product retention of more than 95 percent of the hydrocarbon.

Visual, optical microscope and scanning electron microscope inspection established the homogeneity of both hydrocarbon and zinc distributions.

This product had a substantially lower angle of repose than did identical sulfur particles produced under substantially identical conditions in the absence of hydrocarbon. It had a much lower tendency to bridge and plug conveying and application equipment. The oil-free particles repeatedly bridged a two-inch I.D. vertical chute feeding the particles from a sulfur hopper into subsurface injection knives. These plugs had to be broken by impact on the apparatus exterior. In contrast, there was not one instance of bridging in the same apparatus using the sulfur particles of this example containing about 4 weight percent hydrocarbon.

The products of this example were much more hydrophobic than were the comparison hydrocarbon-free materials as indicated by more rapid water draining from the accumulated product and lower residual water levels. High activity of heterotropic, sulfur-active bacteria was indicated in experimental field trials on cotton. These trials involved the application of 333 pounds per acre of the desired sulfur-hydrocarbon blend. Analysis of plant foliage 30 days after application established an increase in foliage sulfur levels of 0.7 percent over the average base level of 1.0 for untreaded plants in the control group.

EXAMPLE 2

As another illustration of the practice of this invention and compositions that can be obtained thereby, a block of the homogeneous hydrocarbon-sulfur fusion can be prepared by blending 10 pounds of a petroleum gas oil having a melting point below 150° C. and a boiling point range of about 230° to about 425° C. with 90 pounds of molten sulfur at a melt temperature of 150° C. under mixing conditions sufficient to distribute the gas oil throughout the sulfur melt. The homogeneous melt is then cooled and solidified into one or more blocks. The blocks can be crushed into particles of any size by any means of comminution including mechanical grinding. As pointed out hereinabove, the methods and compositions of this invention allow the use of mechanical grinding even in the absence of inert atmospheres due to the low dusting and explosion hazards of these compositions. No matter what degree of comminution is employed in grinding or crushing the sulfur blocks, the resulting particles, even the finest dust particles, will comprise homogeneous hydrocarbon-sulfur fusions containing about 10 weight percent of the gas oil distributed throughout the matrix.

I claim:

1. The method of supplementing the sulfur content of soil including the steps of applying to said soil at least about 20 pounds per acre of a homogeneous hydrocarbonsulfur fusion comprising a continuous rhombic sulfur matrix containing a hydrocarbon nonreactive with sulfur, said hydrocarbon being uniformly distributed throughout said continuous sulfur matrix, wherein said fusion contains at least about 60 weight percent rhombic sulfur and at least about 0.2 weight percent of said hydrocarbon based on the weight of said fusion.

2. The method of claim 1 wherein said fusion contains at least about 80 weight percent rhombic sulfur and comprises particles having average particle diameters of about one inch or less and average pore volumes of at least about 0.04 cc per gram.

3. The method of claim 2 wherein said fusion contains about 0.2 to about 20 weight percent of said hydrocarbon based on the total weight of sulfur and hydrocarbon, and said hydrocarbon is selected from the group consisting of paraffins, aromatics, alkyl aromatics and combinations thereof having boiling points above about 120° C. and melting points below about 400° C.

4. The method of claim 1 wherein said fusion contains about 0.2 to about 20 weight percent of said hdyrocarbon based on the combined weight of said sulfur and hydrocarbon and is produced by the method including the steps of (a) forming a homogeneous melt comprising at least 60 weight percent elemental sulfur and at least about 0.2 weight percent of said hydrocarbon based on the combined weight of said sulfur and hydrocarbon, at a melt temperature of 120° C. to about 400° C., and (b) solidifying said homogeneous melt to form said homogeneous fusion, said hydrocarbon being nonreactive with said sulfur at said melt temperature and having a melting point below said melt temperature and a boiling point above said melt temperature.

5. The method of claim 4 wherein said fusion is formed by quenching and subdividing said homogeneous melt under conditions sufficient to form particles of said fusion having average particle diameters of about one inch or less.

6. The method of claim 5 wherein said homogeneous particles are produced by the methods of including the steps of forming a stream of said homogeneous melt and intersecting said stream with a water stream under conditions, including a relative mass flow rate of at least about 0.6 weight parts water per weight part of said melt, sufficient to disperse said melt into discrete melt droplets, form a single spray of said water and discrete melt droplets, and cool and solidify said droplets into said porous particles of said hydrocarbon-sulfur fusion containing about 0.2 to about 20 weight percent of said hydrocarbon based on the combined weight of said sulfur and hydrocarbon having average pore volumes of at least about 0.04 cc per gram.

* * * * *